No. 806,897. PATENTED DEC. 12, 1905.
J. KAUTZKY.
ATTACHMENT FOR TARGET TRAPS.
APPLICATION FILED MAR. 22, 1904.
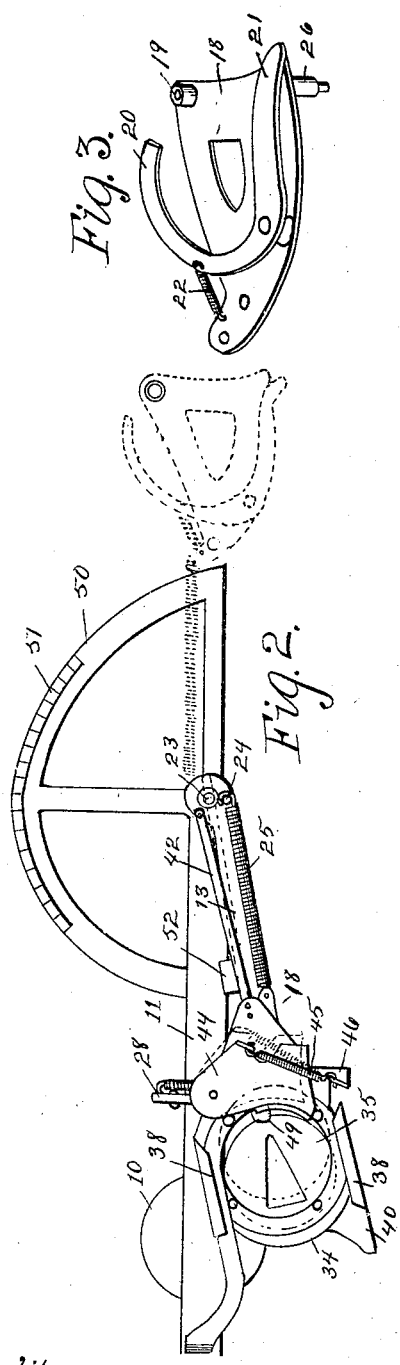
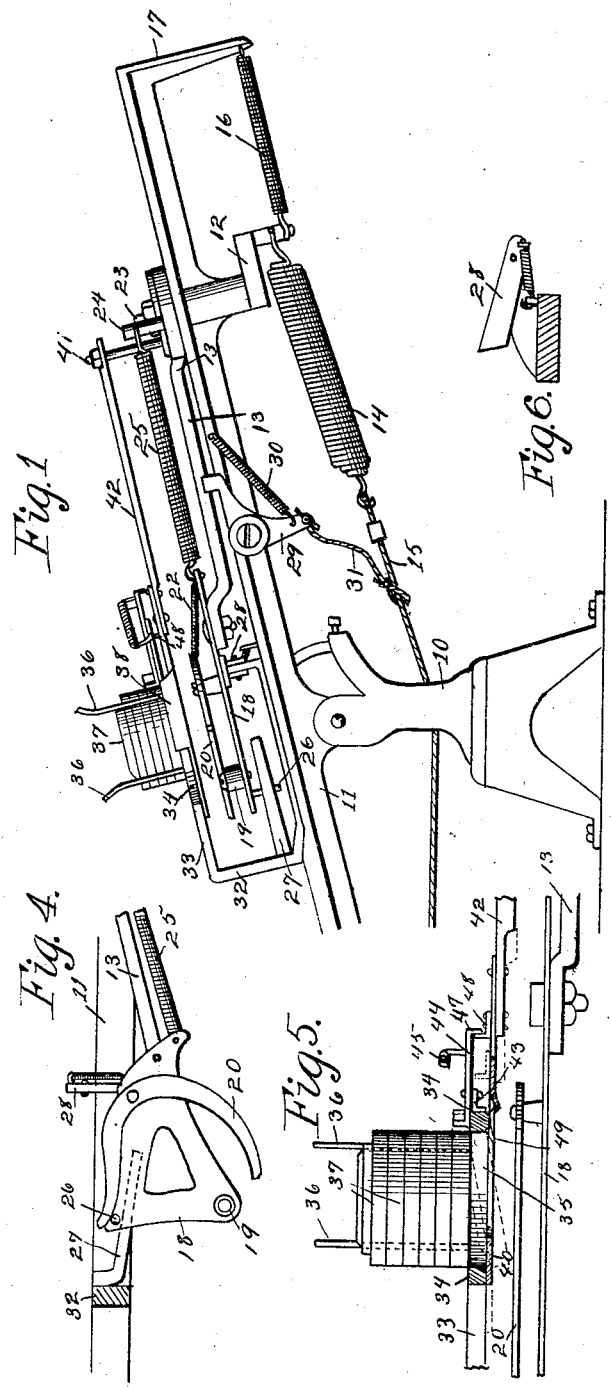
Witnesses
C. G. Hague
S. F. Christy.
Inventor Joseph Kautzky.
By Owing & Lane Att'ys

UNITED STATES PATENT OFFICE.

JOSEPH KAUTZKY, OF FORT DODGE, IOWA.

ATTACHMENT FOR TARGET-TRAPS.

No. 806,897.  Specification of Letters Patent.  Patented Dec. 12, 1905.

Application filed March 22, 1904. Serial No. 199,325.

*To all whom it may concern:*

Be it known that I, JOSEPH KAUTZKY, a citizen of the United States, residing at Fort Dodge, in the county of Webster and State of Iowa, have invented a certain new and useful Attachment for Target-Traps, of which the following is a specification.

The objects of my invention are to provide an automatic dropping mechanism designed to be connected with certain of the target-traps now being made, whereby the targets can be placed above the hand of the target-trap and as the arm swings around and throws the target from the hand and comes back to position beneath the target-supply the dropping mechanism will be operated to allow one of the targets to drop onto the hand, and so on continuously as the trap is operated.

A further object is to provide a new form of hand which is particularly adapted to my dropping mechanism and means for maintaining the hand in a locked position, so that it will be immediately beneath the targets as they stand in the dropping mechanism, and thus allow the targets to be dropped readily upon the hand.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 is a side elevation of the trap and my dropping mechanism attached to it. Fig. 2 is a plan view of the target-trap, showing my dropping mechanism attached to it. Fig. 3 shows in perspective a detail view of my attachment for the hand of the trap. Fig. 4 is a detail view of the hand, showing the position of it as it stands beneath the dropping mechanism. Fig. 5 is a side elevation of that portion of the trap which is adjacent to the dropping mechanism and shows in section said dropping mechanism. Fig. 6 is a detail view of the locking mechanism for maintaining the hand against swinging movement beneath the dropping mechanism.

Referring to the accompanying drawings, I have used the reference-numeral 10 to indicate the base of the target-trap.

The reference-numeral 11 indicates the frame, pivotally and adjustably mounted upon said base. Rotatively mounted in the frame, adjacent to the forward end thereof, is the crank 12, which is connected with the throwing-arm 13 in a manner previously used and described. The crank-arm has attached to it the throwing-spring 14, designed to be operated by the rope 15, which is attached to the ordinary operating-lever. The coil-spring 16 is attached to the crank 12 and to the extension 17 of the frame and is designed to draw the throwing-arm from its extended position back to its point of starting. Pivotally attached to the throwing-arm 13 is the hand, comprising the plate 18, which has the pin 19, with the rubber guard extending around it, mounted near one edge thereof, and has the finger 20 pivotally mounted thereon by means of the pivot 21. The shape of this finger is best illustrated in Fig. 3 of the drawings, and it is designed to be held in position relative to the plate 18 by means of the spring 22, which is connected with the said finger and with the inner end of the plate 18, so that the end 21 of said finger will normally engage the disk, which is to be thrown as a target and hold said disk rigidly against the pin 19 and prevent it from slipping out until it is ready to be thrown, and said disk will be prevented from being thrown out of the hand except between the portion 21 of the finger and the pin 19.

Extending upwardly from that portion of the arm which is adjacent to the crank-shaft 23 is the pin 24. Connecting this pin 24 and the inner end of the hand is the coil-spring 25, designed to hold the hand in position as it is operated. Extending downwardly from the rear of the hand is a pin 26, which is designed to engage the retaining member 27 and prevent the rear of the hand from swinging as the arm moves around from an extended to a set position. Attached to the frame is the spring-maintained latch 28, designed to allow the hand 18 to slip over it and to be engaged by its free end when the hand is in position beneath the dropping mechanism of my device. Said retaining member 27 and the spring-held lug 28 will hold the hand firmly in position directly beneath the dropping mechanism. As the hand swings out toward a throwing position the pin 26 slides longitudinally of the retaining member 27, which causes the spring 25 to be extended and the hand swung around on its pivot partially.

Pivotally attached to the side of the frame is the trigger 29, which is normally held in a locked position by means of the spring 30. Said trigger is engaged by the arm as it swings around from an extended to its normal position and is designed to release the arm when the throwing-spring is extended a certain predetermined distance, inasmuch as the lower end of the trigger 29 is adjustably connected with the rope 15 by means of the rope 31.

Attached to the frame 10 is the upright 32, having the right-angled extension 33 thereon, said right-angled extension having a circular portion 34 at its forward end with the opening 35 extending through it. Extending upwardly from the circular portion 34 are the retaining-wires 36, so arranged that the disks 37 used for targets will be maintained in the position shown in Figs. 1 and 5 of the drawings. Mounted outside of the circular portion 34 and maintained in position relative thereto by means of the angular projections 39 is the slide 40, having a circular opening extending through it of the same size as the opening 35, so that when the opening in this slide 40 is immediately beneath the opening 35, formed by the circular portion 34, the disk used for the target will be allowed to drop through said openings onto the hand 18, which is directly beneath it when the openings are in these relative positions. Extending upwardly from that portion of the arm to which the crank-shaft 23 is attached is the bolt 41. Pivotally connecting the bolt 41 and the inner end of the slide 40 is the sliding arm 42, and inasmuch as the bolt 41 is a slight distance to one side of the shaft 23 upon which the arm swings the slide will be moved longitudinally above the frame as the arm is rotated, and thus cause that portion of the slide which supports the disks 37 above it to be released and permit the disk to drop through the opening 35 and through the opening in the slide onto the hand beneath it.

Pivotally attached to the extension 43 of the circular portion 34 is the disk-retaining member 44, having the spring 45 forcing it constantly toward the upright 32 and into engagement with the lowermost of the disks 37, which is inside of the retaining-wires 36, said spring being attached at its other end to the projection 46, which extends forwardly from the circular portion 34. Extending downwardly from the free end of the target-retaining member 44 is a lug 47. Extending upwardly from a point adjacent to the rear end of the slide is a lug 48, designed to engage the lug 47 as the slide 42 is moved from its rearward limit of movement to its forward limit of movement and cause the disk-retaining member to be thrown out of engagement with the lowerwost disk inside of the retaining-wires and cause said disk to be dropped onto the slide immediately beneath the opening 35, which has been drawn forwardly, so that said disk will rest upon it. I have provided a small lug 49, which is attached to the circular portion 34 and extends toward the central portion of the opening 35, formed by said circular portion 34, against which the lowermost disk 37 is designed to rest, as it also rests upon the slide 40. The slide 40 is moved to its forward limit of movement when the throwing-arm is in its extended position, and as the arm moves to its point of starting the slide will be allowed to move rearwardly, thus allowing the spring 45 to force the disk-retaining member against the disk, thus causing the opening in the slide to come to position immediately beneath the opening 35, and thus allow the lowermost disk, which is in the opening 35, to be dropped onto the hand 18 immediately beneath it. I have provided a semicircular track 50, having a notched sector 51 thereon, in engagement with the notches of which the spring-plate 52 is designed to come to maintain the arm against rearward movement and to take advantage of the momentum of the throwing-arm caused by the spring 16 after the arm has thrown the disk, assuming that the rope 15 has not been released to release the spring. This, however, is not my invention, and a further description of it is deemed unnecessary.

In practical operation and assuming that the throwing-arm 13 is in the position shown in Fig. 1 of the drawings—namely, at the starting-point—and that one of the disks 37 has been placed inside of the retaining-wires 36 and the disk-retaining member has been placed in engagement with the said disk, as shown in Figs. 1 and 5, the operator pulls the rope 15 by means of the lever attached to its rear end, which causes the throwing-spring 14 to be extended and put under tension and the trigger 29 thrown out of engagement with the throwing-arm, thus releasing it to an extended position a little more than half of its circular movement, and then the lever for drawing the rope 15 is released. The spring 16 will then cause the throwing-arm to be drawn back to its point of starting. As the arm reaches the position shown in dotted lines in Fig. 2—that is, at the point where the hand releases the disk—the slide 39 will be beneath the opening 35 and at the same time the slide 40 is moved forwardly, the disk-retaining member 47 will be thrown out of engagement with the lowermost disk 37, and said disk will be allowed to drop into engagement with that portion of the slide 40 which is beneath the opening 35 and into said opening and also to rest against the lug 49, and the rest of the disks 37 will be moved downwardly a distance equal to the thickness of one of the disks, and as the throwing-arm is swung around to its point of starting and the hand comes to position immediately beneath the opening 35 the slide is moved rearwardly, so that the opening in it comes directly beneath the opening 35. This will allow the disk in the opening 35 to drop onto the hand 18, and as it drops onto the hand the stationary lug 49 will cause it to be moved toward the free end of the hand and against the rubber-faced pin 19, and the finger 20 will hold it in engagement with said pin. As this slide moves to its outer limit of movement, where the opening in it is directly beneath the opening 35, the spring 45 will cause the disk-retaining member to engage the disk 37 adjacent to it and limit it in that position until it is again released by the throwing-arm to allow the next disk to drop into the opening 35, and the operation is repeated. The rapidity with which the device can be operated is of great value owing to the fact that all the boy who attends to the loading of the target-trap has to do is to drop these disks inside of the retaining-wires, and this can be done rapidly and without danger of being hit by the revolving throwing-arm 13.

Having thus described my invention, what I claim, and desire to secure by Letters Patent of the United States therefor, is—

1. In a target-trap, a frame, a throwing-arm pivotally mounted on the frame, an upright attached to the frame, an extension at right angles to said upright having a parallel portion at its forward end with a circular opening through it, retaining-wires extending upwardly from said circular portion, a slide having a circular opening of the same size as the opening in said circular portion, a pivotally-mounted disk-retaining member connected with said circular portion, means connected with the throwing-arm and with the sliding member designed to be operated by the arm as it is swung on its pivot for operating the sliding member and the disk-retaining member to drop a disk mounted inside of the retaining-wires onto the arm after it has been swung in a complete circle on its pivot.

2. In a target-trap, a throwing-arm, a hand pivotally attached to the throwing-arm, a spring-controlled substantially semicircular finger pivotally mounted above and forming a part of said hand.

3. In a target-trap, a throwing-arm, a hand pivotally attached to the throwing-arm, a spring-controlled substantially semicircular finger pivotally mounted above and forming a part of said hand, a pin extending upwardly from and forming a part of the hand, for the purposes stated.

4. In a target-trap, a pivotally-mounted throwing-arm, a pivotally-mounted hand attached to the free end of said arm, a spring connected with the hand and with the arm for holding the hand in position relative to the arm, means for actuating said arm, a spring-held trigger designed to maintain the arm at its starting-point, a retaining member and a spring-held lug designed to hold the hand in position when the throwing-arm engages the said trigger.

5. In a target-trap, a pivotally-mounted throwing-arm, a pivotally-mounted hand attached to the free end of said arm, a spring connected with the hand and with the arm for holding the hand in position relative to the arm, means for actuating said arm, a spring-held trigger and designed to maintain the arm at its starting-point, a retaining member and a spring-held lug designed to hold the hand in position when the throwing-arm engages the said trigger, a target-retaining device mounted above the hand when the throwing-arm is in engagement with the trigger, a dropping mechanism mounted adjacent to the retaining device, means connected with the dropping mechanism and with the arm for operating the dropping mechanism as the arm is swung on its pivot to feed the disks mounted in the retaining device onto the hand as the hand comes to position beneath it.

JOSEPH KAUTZKY.

Witnesses:
 T. F. FLAHERTY,
 A. SHIELDS.